March 22, 1938.  J. C. STONE  2,111,648
POSTURE MEASURING DEVICE
Filed Oct. 19, 1936  2 Sheets-Sheet 1
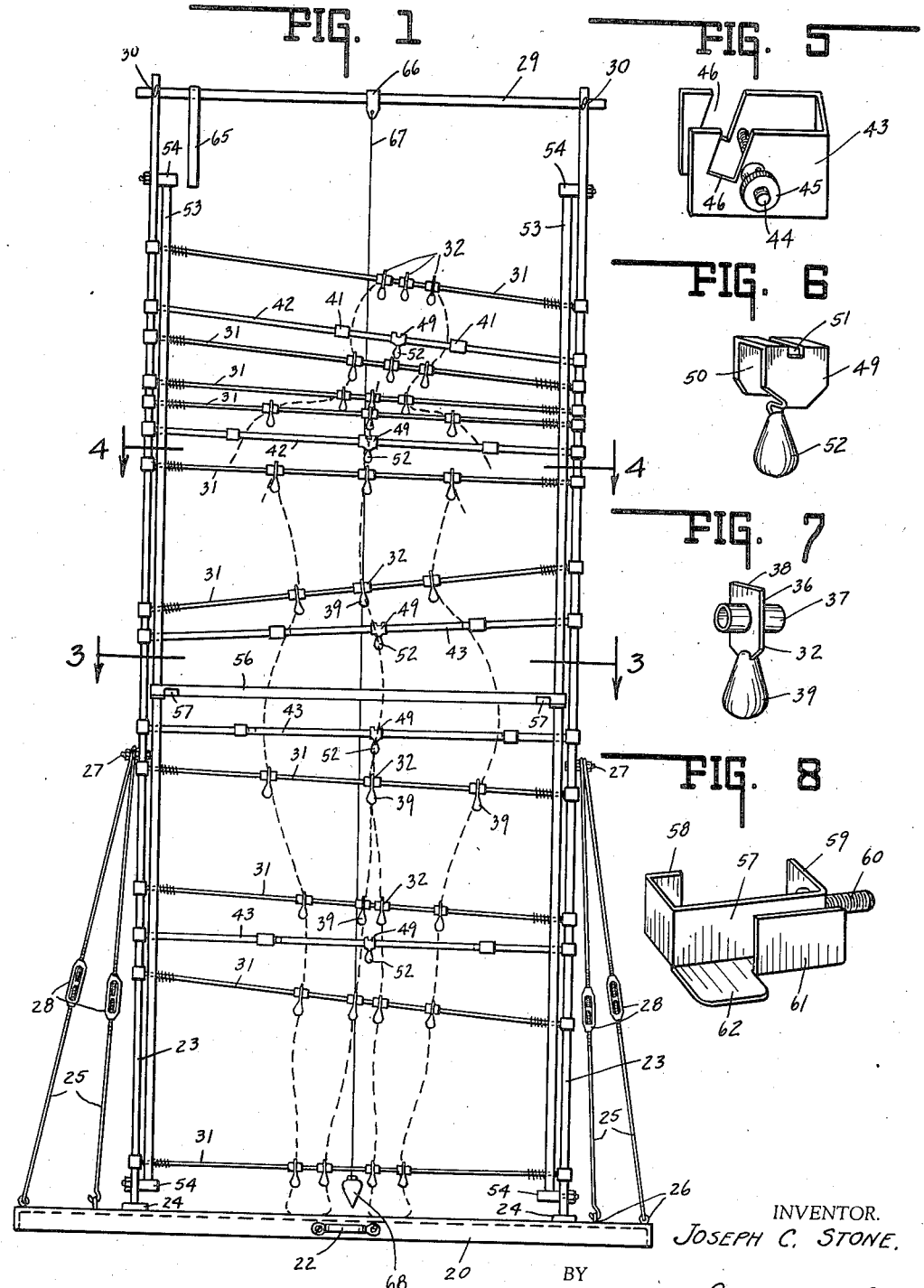
INVENTOR.
JOSEPH C. STONE.
BY Lockwood Goldsmith & Galt
ATTORNEYS.

March 22, 1938. J. C. STONE 2,111,648
POSTURE MEASURING DEVICE
Filed Oct. 19, 1936 2 Sheets-Sheet 2
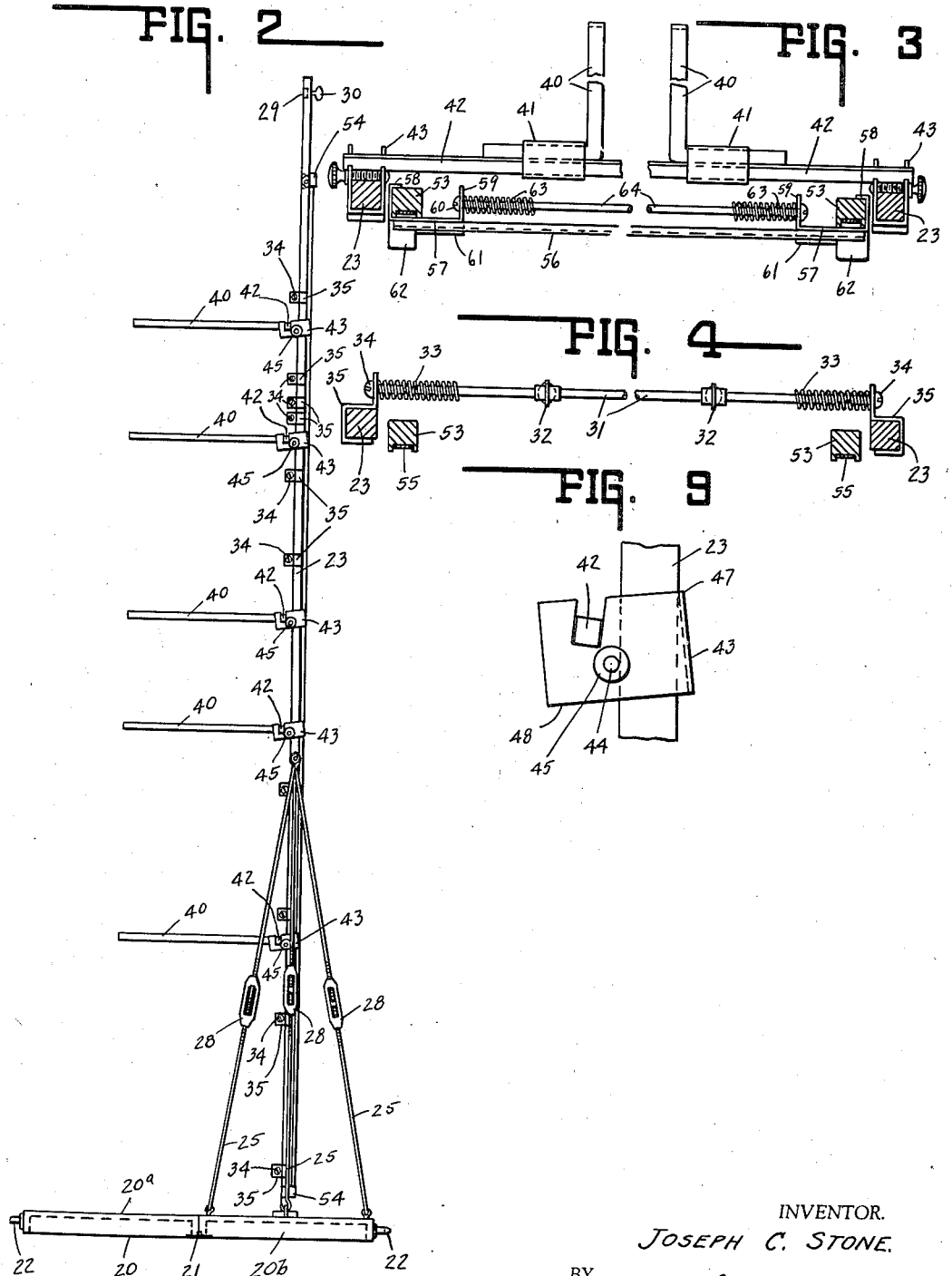
INVENTOR.
JOSEPH C. STONE.
BY Lockwood Goldsmith & Galt.
ATTORNEYS.

Patented Mar. 22, 1938

2,111,648

UNITED STATES PATENT OFFICE 2,111,648

POSTURE MEASURING DEVICE

Joseph C. Stone, Kokomo, Ind.

Application October 19, 1936, Serial No. 106,323

8 Claims. (Cl. 33—174)

This invention relates to a posture measuring device. The medical profession recognizes that many body ills are due to incorrect posture and has devised various treatments for the correction thereof. The present invention has for its principal object the provision of a device by means of which the body posture of a subject may be accurately measured for recording and analysis. By this means, recording of the subject's posture may be made from time to time and the effects of treatment may be accurately determined by comparison of records made as the treatment progresses.

Another object of the invention is to provide a device of this kind so constructed that the measurement of the body contours may be made in the shortest possible time, thus making it unnecessary for the subject to stand in one position for any great length of time.

The invention provides a rigid frame upon which a number of indicating devices are adjustably mounted. These devices may be moved about quickly and easily to positions corresponding to points on the body contours. The position of the indicators may then be measured after the subject has been excused and may be recorded on suitable cross section paper for future reference. The apparatus is also provided with stabilizers which engage selected parts of the body of the subject to maintain the same in a stationary position during the adjustment of the indicators. The indicators are made in such manner that they may be adjusted rapidly and accurately, thus making it unnecessary for the subject to stand in a rigid position for an excessive length of time.

The full nature of the invention and other objects and features thereof will be understood from the accompanying drawings and the following description and claims:

Fig. 1 is a front elevational view of the apparatus as a whole. Fig. 2 is a side elevational view thereof. Fig. 3 is a sectional view taken on the line 3—3 of Fig. 1. Fig. 4 is a similar view taken on the line 4—4 of Fig. 1. Fig. 5 is a perspective view of a fitting used for the support of the stabilizers. Fig. 6 is a perspective view of one of the indicators. Fig. 7 is a similar view of another type of indicator. Fig. 8 is a perspective view of a fitting used for the support of a horizontal scale for measuring the positions of the indicators. Fig. 9 is a fragmentary side view showing the method by which the stabilizer fittings are secured upon the frame.

In the present preferred form of the invention illustrated herein, the apparatus is carried upon a base 20 consisting of two parts 20a and 20b secured together by hinges 21 and provided with handles 22. The base 20 is of a hollow construction and forms a box in which the apparatus may be packed when disassembled. In packing, the parts are placed in one of the halves, the other serving as the lid. It may then be carried by the handles 22.

A pair of vertical frame members 23 are set in suitable sockets 24 carried by the half 20b of the base. Said frame members are rigidly secured in position by means of tie rods 25 which are secured to eyes 26 on the base and to bolts 27 on the frame members. The tie rods 25 are provided with turn buckles 28 which may be tightened to secure rigidity of the frame. A horizontal frame member 29 is morticed to the vertical frame members 23 adjacent their upper ends and is secured thereto by thumb screws 30.

The apparatus is provided with a plurality of indicator units, herein shown as ten in number, consisting of indicator rods 31 each carrying a plurality of indicators 32. Each end of each indicator rod is frictionally secured within the end of a tension spring 33 and the opposite ends of said springs are similarly secured to screws 34 carried by hooked fittings 35 adapted to embrace the vertical frame members 23. The rods 31, springs 33 and fittings 35 together form a resiliently extensible unit which is normally slightly shorter than the distance between the vertical frame members 23. When the fittings 35 are hooked about the vertical frame members 23, as shown in Fig. 4, there is sufficient slippage of the central coils of the springs 33 to permit stretching of said springs and thus to provide sufficient friction to prevent the fittings from sliding downwardly on the frame members. At the same time, the friction is not so great as to prevent ready vertical movement of the entire unit by hand. Because of the resiliency of the springs 33, each unit may be set in an angular position, as shown by several of the units in Fig. 1, and will easily retain this position as long as desired. The indicators 32 carried by the rods 31 consist of a flat vertical plate 36 having secured therein, by solder or otherwise, a tubular member 37 through which the rod 31 may pass. Each indicator is provided with a straight upper edge 38 and a downwardly extending weight 39 which serves to maintain the indicator on the rod with its upper edge in a substantially horizontal position.

The stabilizer units are best seen in Fig. 3 and consist of L-shaped stabilizer members 40 each having one leg engaging a fitting 41 slidably mounted on rectangular stabilizer bars 42 which in turn are supported on fittings 43 carried by the vertical frame members 23. The fittings 43 are formed as best seen in Fig. 5 in a U-shape which may embrace the vertical frame members 23. Each fitting is provided with a screw 44 having a nut 45 and with a pair of notches 46 in which the stabilizer bars 42 may rest. The nuts 45 are so adjusted that the fittings 43 may easily slide on the frame members 23 so long as the weight of the stabilizers themselves is otherwise supported. However, when the weight of the stabilizers is permitted to rest freely upon the fittings, they assume the position shown in Fig. 9, in which the bolt 44 and the upper edge 37 of the fitting are cramped against opposing faces of the frame members 23 and frictionally prevent the unit from sliding downwardly. In order to adjust the position of the unit vertically, it is only necessary to tilt the fittings upwardly by pressure on their lower edges at 48. This relieves the pressure on the bolt 44 and the edge 47 and permits the entire unit to be easily moved up and down. Each of the stabilizer bars 42 carries two of the stabilizers 40 which extend outwardly from the apparatus to engage the body of the patient. Each of said bars, in addition, carries an indicator 49, best shown in Fig. 6. This type of indicator is provided with a hooked portion 50 fitting the rectangular stabilizer bar 42, with a notch 51 in its upper surface and with a weight 52 serving to maintain the same in the proper position on the stabilizer bar.

Adjacent each of the frame members 23 there is provided a vertical scale bar 53 which may be rigidly secured to the frame members by means of fittings 54 bolted thereto. Each of the scale bars 53 is provided with a graduated scale 55 preferably a steel tape inset in a groove in the bar, as best seen in Fig. 4. The surface of the tape is preferably set behind the outer surface of the bar so that the bar may be cleaned and polished without obliterating the graduations on the tape. The tape is cemented or otherwise suitably secured in place. The graduations on the tape are set to read the distance above the upper surface of the base 20 upon which the patient stands.

A horizontal scale unit consisting of a scale bar 56 resting in fittings 57 is also provided. The fittings 57 are best seen in Fig. 8 and are provided with hooked portions 58 engaging the vertical scale bars 53, with inturned portions 59 to which are secured screws 60, and with an upturned portion 61 serving as a retainer for the scale 56. Outwardly projecting portions 62 serve as handles for conveniently moving the fittings up and down on the vertical scale bars. Tension springs 63 are secured to the screws 60 and their opposite ends are secured to a rod 64 extending between the same. The fittings 57 are thus resiliently secured together in the same manner as the indicator rod fittings and will thus hold any adjusted position on the vertical scale bars. At the same time, they are easily moved up and down by the operator. The scale bar 56 carries a graduated tape secured thereto in the same manner as tapes 55 are secured to bars 53.

The scale bars 53 are made sufficiently tall for an ordinary person but if necessary an auxiliary scale 65 may be slidably mounted on the horizontal frame member 29 to measure heights beyond the end of said scale bars. A hook 66 slidably mounted on the horizontal frame member 29 has secured thereto a plumb line 67 carrying a plumb bob 68.

In the use of the apparatus, the subject stands on the portion 20a of the base and assumes his customary posture. The various indicator rods and stabilizer bars are set to their approximate positions while the subject is permitted to stand freely without restraint. When the positions of the bars and rods have been approximately determined, the upper pair of stabilizers 40 is brought into contact with the sides of the subject's head to hold the same in its natural position. The indicators on the two upper rods are then adjusted to selected points on the contour of the head as shown in Fig. 1. Next, the second pair of stabilizers is brought in contact with the arms just below the shoulders and the adjacent indicators are adjusted. The procedure is followed until the stabilizers and indicators are set, whereupon the subject may be excused.

In the case of the indicators shown in Fig. 7, the upper edge 38 is maintained in the horizontal position by the weight 39. This edge, therefore, provides a line of sight which is substantially perpendicular to the vertical plane in which the indicator rods are moved even though the indicator rods themselves may be in an angular position. Thus, by sighting along the edge 38, the indicator may be accurately placed at points on the projection of the body contour on the plane of movement of the rods. Similarly, in the use of the indicators shown in Fig. 6, the groove 51 furnishes the necessary line of sight which is similarly maintained perpendicular to the vertical plane. If desired, a rule or other form of straight edge may be laid on the line of sight and projected to actually touch the patient at the desired point. Preferably, indicator rods are provided for the top of the head, the base of the skull, the base of the neck, the point of the shoulder, the arm pit, the waist, the region of the coccyx, the knee, the calf of the leg and the ankle. On each of the upper seven rods, an indicator is provided for each side of the body and one for the spine. The indicators 49 on the stabilizer rods are provided for the spine and the stabilizers themselves perform the function of indicators. The lower three indicator rods are each provided with four indicators, two for each leg. Stabilizers are provided for the head, the arms just below the shoulders, the upper edges of the innominate bones and the hips. An extra stabilizer is provided for children.

When the subject has been excused, the horizontal scale 56 is then moved to the position of each indicator in turn. Preferably this scale reads in both directions from zero at the center, the zero point being placed on the plumb line 67. The horizontal coordinates of the indicator points are read upon this scale and the vertical coordinates are read on the vertical scales 65 at their point of intersection with the upper edge of the horizontal scale. Using these coordinates, the points are plotted on suitable cross section paper to make a permanent record of the contour of the body and the curvature of the spine. Such recordings are made from time to time during the progress of the treatments given each subject and provide comparisons which clearly indicate the results obtained.

In making a survey of a subject by this apparatus, he is required to stand rigid only during the final adjustment of the indicators, since the vertical adjustment of the indicator rods and stabilizer bars is made without restraint. The final adjustment can be rapidly and accurately made because of the line of sight provided on each indicator. Small vertical adjustments can also be promptly made since both the stabilizer fittings and indicator rod fittings slide easily on the vertical frame members and remain securely in place when once set.

The record obtained from this apparatus gives an accurate quantitative measure of posture defects such as misalined shoulders or hips and curvatures of the spine and provides valuable assistance for the physician in prescribing treatment and in checking the results thereof.

The invention has been described in its present preferred form. Many variations in the details thereof may be made by those skilled in the art without departing from the scope of the invention as defined by the appended claims.

The invention claimed is:

1. A device of the class described, including a frame, indicating devices adjustably mounted on said frame, said devices being movable in a common plane to positions representing points on the projection in said plane of selected parts of the body of a subject, and a scale movable on said frame independently of the movement of said indicating devices and arranged to measure the positions of said indicating devices in said plane.

2. A device of the class described, including a frame, indicator carrying members adjustably mounted on said frame for movement in a common plane, indicators adjustably carried on said carrying members and movable in said plane in a direction transverse to the movement of said carrying members to positions representing points on the projection in said plane of selected parts of the body of a subject, and a scale movable on said frame independently of the movement of said indicating devices and arranged to measure the positions of said indicating devices in said plane.

3. A device of the class described, including a frame, indicator carrying members vertically adjustable on said frame for movement in a vertical plane, indicators adjustably carried on said carrying members and movable in said plane in a direction transverse to the movement of said carrying members to positions representing points on the projection in said plane of selected parts of the body of a subject, and a scale movable on said frame independently of the movement of said indicating devices and arranged to measure the positions of said indicating devices in said plane.

4. A device of the class described, including a frame, indicator carrying members vertically and angularly adjustable on said frame for movement in a vertical plane, indicators adjustably carried on said carrying members and movable in said plane in a direction transverse to the movement of said carrying members to positions representing points on the projection in said plane of selected parts of the body of a subject, and scales arranged to measure the positions of said indicating devices in said plane.

5. A device of the class described, including a pair of spaced rigid vertical frame members, indicator rods extending between the same and adjustable thereon in a vertical plane, indicators slidably and rockably mounted on said rods, each of said indicators having a portion providing a line of sight which may be directed to a selected point on the body of a subject, and a weight carried by each of said indicators to maintain the same in a predetermined position with its line of sight substantially perpendicular to said vertical plane.

6. A device of the class described, including a pair of spaced rigid vertical frame members, indicator rods extending between the same and vertically slidable thereon, indicators slidably mounted on said rods, a vertical scale adjacent each of said frame members, and a substantially horizontal scale slidably mounted for vertical movement on said vertical scales, said frame members and vertical scales being separated to permit independent vertical adjustment of said indicator rods and said horizontal scale.

7. A device of the class described, including a frame, stabilizer carrying members vertically and angularly adjustable on said frame, stabilizers adjustably carried thereby and extending substantially horizontally to engage and stabilize the body of a subject at selected points, indicator carrying members vertically adjustable on said frame, and indicators adjustably carried thereon.

8. A device of the class described, including a frame, stabilizer carrying members vertically and angularly adjustable on said frame, stabilizers adjustably carried thereby and extending substantially horizontally to engage and stabilize the body of a subject at selected points, indicator carrying members vertically adjustable on said frame, indicators adjustably carried thereon, a vertical scale adjacent each side of said frame, and a substantially horizontal scale slidably mounted for vertical movement on said vertical scales.

JOSEPH C. STONE.